Patented Oct. 3, 1939

2,174,810

UNITED STATES PATENT OFFICE 2,174,810

PROCESS FOR SWEETENING OF HYDROCARBON OILS

George Hugo von Fuchs and Lawson Elwood Border, Wood River, Ill., assignors to Shell Development Company, San Francisco, Calif., a corporation of Delaware No Drawing. Application February 19, 1937, Serial No. 126,647

5 Claims. (Cl. 196—30)

This invention relates to improvements in the treatment of hydrocarbon oils and more particularly to an improved process for sweetening and desulfurizing hydrocarbon distillates.

The process herein described is a continuation in part of our application Serial No. 574,920, filed November 13, 1931, now Patent No. 2,080,365.

The object of the invention, generally, is to provide a process whereby petroleum distillates, e. g. gasoline, naphtha, kerosene, furnace oils, and liquid and vapor phase cracked distillates, may be treated to desulfurize and sweeten the same, thereby producing a treated distillate having a good odor, negative doctor and negative corrosion tests, and a low gum content, as well as an improved color stability and antiknock value.

Broadly our process comprises treating the hydrocarbon distillate in the liquid phase and at substantially normal room temperature with an active copper reagent in the presence of a gaseous acidic activator to convert the mercaptans to copper mercaptides which are soluble in liquid hydrocarbons, and then removing the copper mercaptides from the distillate in any suitable manner.

Active copper reagents in the order of their activities are metallic copper in various forms, copper oxides and copper salts. In general, we prefer metallic copper not only because it appears to react faster than either the oxides or salts but also because at times it is capable of effecting sweetening when, under identical conditions, the oxides and particularly the salts are incapable of having this effect. Likewise oxides are superior to salts.

If metallic copper is employed, it is preferably used in a form which provides a large reacting surface, for example, in the form of turnings, filings, wool or powder. A particularly fine powder can often be obtained by precipitation from a solution of a copper salt, for instance, by reacting such a solution with a metal having a higher oxidation-reduction potential than copper.

The rate of reaction, i. e., the formation of copper mercaptides during the contact of the sour hydrocarbon solution with the copper reagent is greatly accelerated by the presence of certain gaseous accelerators, notably hydrogen chloride and sulfur dioxide. These gases are advantageously dissolved in the oil prior to contacting it with the copper reagent. While these particular accelerators have been found to give very satisfactory acceleration, in general, any oil-soluble material of strongly acidic nature, which has no harmful effect on the oil and which can be removed with sufficient ease after treatment may be used as an accelerator. Thus, instead of hydrogen chloride gas, we may use any of the other hydrogen halide gases, namely hydrogen fluoride, hydrogen bromide, or hydrogen iodide. On the other hand, hydrogen sulfide being very undesirable and harmful to the oil should be avoided, and besides it, as well as gases like carbon dioxide, having extremely low acidities, is incapable of materially accelerating the rate of copper mercaptide formation.

The presence of added water, although permissible, is frequently undesirable. When using a copper reagent which is insoluble in water, as metallic copper or copper oxide, water seems to reduce the rate of reaction materially, possibly because the metal surface is wetted by water more easily than by mercaptans, thereby making difficult the contact between the reacting surface and the mercaptans, mercaptans being substantially insoluble in water. Moreover, aqueous acids tend to decompose copper mercaptides to mercaptans and the copper salt of the acid, particularly at elevated temperatures, the degree of the decomposition being the result of a complicated equilibrium which depends, among other things, on the relative solubilities of the copper mercaptides in the hydrocarbon and aqueous phases, and the hydrogen ion concentration in the hydrocarbon phase. Copper mercaptides going in solution in the aqueous phase are immediately decomposed quantitatively to the free mercaptan and copper salt by a relatively strong acid. Therefore, if the solubility of the copper mercaptide in the aqueous phase is lowered as by the addition of a copper salt, for instance, copper chloride, an improved degree of sweetening may be obtained.

The presence of hydrogen ions in the hydrocarbon phase is attributable to the small amount of water dissolved therein, and since the amount of water in a given distillate at a certain temperature is constant, saturation being assumed, the hydrogen ion concentration in the hydrocarbon phase becomes a function of the strength and concentration of the acid. For this reason, a strong aqueous acid, as hydrochloric acid, will cause a greater degree of decomposition of the mercaptides than a weaker acid, and whereas it is often possible to effect sweetening in the presence of aqueous weak acid, sweetening is made impossible by the presence of aqueous hydrochloric acid.

Inasmuch as the solubility of water in hydrocarbons rises rapidly with increasing temperature, the harmful effect of the aqueous acids becomes increasingly noticeable at higher temperatures, these increases being relatively greater for the stronger acids than for the weaker ones.

The small amount of water which is liberated during the formation of mercaptides as is shown in the illustrative equation below $$Cu_2O + 2RSH \rightarrow Cu_2(SR)_2 + H_2O$$

appears to be insufficient in most instances to prevent sweetening in the presence of a hydrogen halide gas, at least at relatively low temperatures, in the absence of added water.

Usually the formation of copper mercaptides, when accelerated by a gaseous accelerator of the type hereinbefore described, proceeds satisfactorily at substantially normal room temperatures, so that external heating becomes unnecessary. Relatively high temperatures being usually undesirable, for reasons explained before and also because, in the absence of water, copper mercaptides sometimes tend to decompose to disulfides and copper, particularly in the presence of acids and certain corrosive metals, as iron, we limit the temperature of reacting the distillate with an active copper reagent to below about 200° F. and preferably below 150° F., sweetening being unsatisfactory at higher temperatures.

The copper mercaptides formed in this treating step are substantially soluble in hydrocarbon oil, so that they are carried away from the reaction zone. At room temperature they are quite stable and substantially resistant to hydrolysis with water, although not resistant to hydrolysis with aqueous acids as hereinbefore stated; alkaline hypochlorite solutions apparently do not affect them to any extent, and with free sulfur they react but very slowly. In this respect they differ greatly from lead mercaptides formed during doctor treatment. Free oxygen, however, may convert them at least partially to disulfides even at normal room temperatures. Since, however, disulfides are in general undesirable in that many of them may boil within the boiling range of the distillate under treatment and therefore are not separable by distillation thus preventing a reduction of the sulfur content, and, moreover, they adversely affect knock ratings and lead susceptibilities of gasolines, we normally prefer to operate under conditions substantially to prevent their formation, i. e. we carry out our process under non-oxidizing conditions and particularly in the absence of free oxygen.

At higher temperatures the copper mercaptides are less stable. In the absence of oxygen, steam, acids and alkalies, they can be heated to about 350° F. without material decomposition, a property which makes possible the separation of the mercaptides from the distillate by distillation below 350° F. The presence of acids or alkalies, however, especially in combination with steam, greatly accelerates the decomposition at temperatures above about 200° F., particularly in contact with metals which are subject to corrosion, such as iron and steel.

Upon distillation, under conditions to avoid decomposition, mercaptan sulfur remains in the residue, and the overhead product has a considerably reduced sulfur content, is normally sweet to the doctor test, and has a pleasant, agreeable odor. Many of the sulfur compounds which do remain in the overhead product can be removed readily by sulfuric acid treatment.

Copper mercaptides may also be removed from the distillate solution by sulfuric acid treatment, mercaptides from cracked distillates being readily removed by ordinary concentrated sulfuric acid, whereas straight run mercaptides may require fuming sulfuric acid.

If the presence of disulfides in the treated distillate is not objectionable, oxidation methods may be employed to remove the copper mercaptides. While under many conditions we do not prefer such methods for reasons hereinbefore pointed out, yet oxidation methods are simple and effective, if properly carried out. A convenient oxidation method for removing the copper mercaptides is by treatment with ferric chloride. The ferric chloride may be used in the anhydrous or hydrated form or in an aqueous solution. It may act as a coagulator for the mercaptides causing their precipitation, or it may act as an oxidizing reagent, effecting conversion of the mercaptides to disulfides according to equations of which the following is an illustration:

$$2FeCl_3 + Cu_2(SR)_2 \rightarrow FeCl_2 + Cu_2Cl_2 + S_2R_2$$

While anhydrous ferric chloride is predominantly a precipitating agent, aqueous ferric chloride is predominantly an oxidizing agent.

The velocity of the oxidation reaction with aqueous ferric chloride depends largely on its concentration. At low concentrations, the presence of relatively large proportions of free aqueous hydrochloric acid, liberated from the chloride by hydrolysis, tends to decompose the copper mercaptides in the manner hereinbefore described, so that sweet distillate cannot be obtained. The minimum concentration of ferric chloride necessary to effect sweetening of the copper mercaptide solution depends to some extent on the type of distillate to be sweetened and is easily determined experimentally in each individual case.

As shown in the last equation the used ferric chloride solution contains some ferrous chloride and copper chloride. This ferrous chloride can be reconverted to ferric chloride by oxidation, for instance, with air, and the copper chloride, after it has reached a certain concentration, can be exchanged for iron chloride by contact with metallic iron such as steel wool, scrap iron, iron filings, etc., whereby iron goes in solution and the copper is precipitated in metallic form and can be used to contact sour distillate.

The distillate resulting from the ferric chloride treatment is advantageously distilled, whereby a sweet product of low gum content and high color stability is obtained.

A further method of sweetening sour distillates consists of mixing finely divided copper such as precipitated copper with clay and passing through this treated mixture a sour gasoline containing an accelerator, such as hydrogen chloride or sulfur dioxide gases. This particular method of treating is well adapted for the sweetening of cracked gasolines.

As illustrative of the application of the process of the present invention, the following methods of procedure are suggested:

Sour cracked distillate may be first acid-treated and after sludge is separated and gaseous hydrogen chloride is added, is passed through copper turnings, then given the main acid treatment, then neutralized with caustic soda or with gaseous ammonia, and then steam distilled to the required end point.

Sour cracked distillate containing gaseous hydrogen halide accelerator may first be contacted with powdered copper, cuprous oxide or cupric oxide, and the excess copper settled out or filtered. The distillate may then be sulfuric acid treated with an amount and strength of acid normally required for treating similar sour distillates, and the then treated oil is neutralized and steam distilled.

Sour cracked gasoline containing dissolved acid accelerator may be filtered through clay admixed with precipitated copper, cuprous oxide or cupric oxide, and the gasoline is then water washed.

Sour straight run gasoline may be first acid treated, then after sludge separation without neutralization, and if desired in the presence of added hydrogen halide, passed through fine copper turnings, then given a second acid treatment preferably of 100% strength, and then neutralized.

Sour cracked gasolines containing an accelerator, such as hydrogen chloride gas in solution, may be contacted with copper turnings or powder of copper or copper oxides and then passed through clay.

Sour straight run or cracked gasoline, naphtha, or kerosene containing an accelerator, such as hydrochloric acid gas, may be passed through a mixture of clay and precipitated copper or copper powder or copper oxides, and then water washed.

Sour straight run gasoline containing an accelerator, such as hydrochloric acid gas, may be passed over copper turnings and then treated with anhydrous or hydrated crystalline ferric chloride and then preferably filtered with or through clay.

Sour straight run gasoline, containing dissolved hydrochloric acid gas, may be contacted with copper powder, cuprous oxide or cupric oxide, treated with a concentrated aqueous solution of ferric chloride, and then acid treated.

The following examples further illustrate our process:

Example 1

Sour West Texas gasoline containing .141% sulfur was treated with $Cu_2O$ in the absence of an accelerator. A small amount of ferric chloride was added to the resulting gasoline, followed by a treatment with 5 lbs./bbl. 93% sulfuric acid and percolation through clay. The treated gasoline had a sulfur content of .037%.

The same sour gasoline was treated identically with the exception of introducing a small amount of gaseous hydrogen chloride into the gasoline during the treatment with $Cu_2O$. The sulfur content was reduced to .023%.

Example 2

Sour gasoline was percolated upwardly through cupric oxide in the presence of a small amount of dissolved gaseous hydrochloric acid. The resulting gasoline was treated with .125% ferric chloride, then with clay to remove suspended iron, then with 2 lbs./bbl. 93% sulfuric acid, and neutralized. The finished gasoline was non-corrosive at 122° F. and doctor sweet.

Example 3

Sour straight run Hendricks gasoline of a sulfur content of .185% was treated with 5 lbs./bbl. 93% sulfuric acid. One portion of the acid treated gasoline containing a mere trace of $SO_2$, and thus being practically free from accelerator, was agitated with copper powder at ordinary room temperature. Some of the mercaptans were slowly converted to mercaptides, which were precipitated with ferric chloride. However, the resulting gasoline remained sour. To the other portion a small amount of gaseous hydrogen chloride was added and the mixture was treated in the same manner, whereby it was rendered doctor sweet.

We claim as our invention:

1. In the process of refining a liquid hydrocarbon solution of mercaptans, the step of treating the solution at a temperature below 200° F. with metallic copper in the presence of an effective quantity of added hydrogen halide gas.

2. In the process of sweetening a liquid hydrocarbon solution of mercaptans, the steps of treating the solution at a temperature below 200° F. with metallic copper in the presence of an effective quantity of added hydrogen halide gas, whereby the mercaptans are converted to hydrocarbon-soluble copper mercaptides, separating the resulting solution from the reagent, neutralizing the solution and distilling same at a temperature below 350° F. to separate hydrocarbons from copper mercaptides.

3. In the process of refining a liquid hydrocarbon solution of mercaptans, the steps of treating an amount of the solution at a temperature below 200° F. with metallic copper in the presence of an effective amount of added hydrogen halide gas, whereby the mercaptans are converted to hydrocarbon-soluble copper mercaptides, treating the resulting hydrocarbon solution with an aqueous solution of ferric chloride to convert the copper mercaptides to disulfides and copper chloride, thereby reducing an equivalent amount of ferric chloride to ferrous chloride, separating the aqueous solution containing iron and copper chlorides from the hydrocarbon liquid, oxidizing the aqueous ferrous chloride to ferric chloride, contacting the oxidized aqueous solution with metallic iron to replace the copper in the solution with iron, thereby precipitating metallic copper and regenerating the ferric chloride solution and treating a further amount of said solution of mercaptans with the precipitated copper and regenerated ferric chloride solution.

4. In the process of refining a liquid substantially water-free hydrocarbon solution of mercaptans, the step of treating the solution at a temperature below 200° F. with metallic copper in the presence of added hydrogen halide gas.

5. In the process of refining a liquid substantially water-free hydrocarbon solution of mercaptans, the step of treating the solution at a temperature below 200° F. with metallic copper in the presence of added hydrogen chloride gas.

GEORGE HUGO von FUCHS.
LAWSON ELWOOD BORDER.